United States Patent
Wang et al.

(10) Patent No.: US 11,761,930 B2
(45) Date of Patent: Sep. 19, 2023

(54) PREDICTION METHOD OF PART SURFACE ROUGHNESS AND TOOL WEAR BASED ON MULTI-TASK LEARNING

(71) Applicant: DALIAN UNIVERSITY OF TECHNOLOGY, Liaoning (CN)

(72) Inventors: Yongqing Wang, Liaoning (CN); Bo Qin, Liaoning (CN); Kuo Liu, Liaoning (CN); Mingrui Shen, Liaoning (CN); Mengmeng Niu, Liaoning (CN); Honghui Wang, Liaoning (CN); Lingsheng Han, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 435 days.

(21) Appl. No.: 17/260,156

(22) PCT Filed: Mar. 6, 2020

(86) PCT No.: PCT/CN2020/078180
§ 371 (c)(1),
(2) Date: Jan. 13, 2021

(87) PCT Pub. No.: WO2021/174525
PCT Pub. Date: Sep. 10, 2021

(65) Prior Publication Data
US 2021/0364482 A1    Nov. 25, 2021

(51) Int. Cl.
*G01B 17/08*    (2006.01)
*G01N 29/14*    (2006.01)
(Continued)

(52) U.S. Cl.
CPC ......... *G01N 29/4481* (2013.01); *G01B 17/08* (2013.01); *G01N 29/14* (2013.01);
(Continued)

(58) Field of Classification Search
CPC .. G01N 29/4481; G01H 1/00; B23Q 17/0957; B23Q 17/0995; B23Q 17/006;
(Continued)

(56) References Cited

U.S. PATENT DOCUMENTS

| | | | |
|---|---|---|---|
| 2016/0349737 A1* | 12/2016 | Yen | H04L 67/125 |
| 2018/0307198 A1 | 10/2018 | Aizawa et al. | |
| 2020/0166909 A1* | 5/2020 | Noone | G06N 20/00 |

FOREIGN PATENT DOCUMENTS

| | | |
|---|---|---|
| CN | 107584334 A | 1/2018 |
| CN | 108563866 A | 9/2018 |

(Continued)

*Primary Examiner* — Jeffrey P Aiello
(74) *Attorney, Agent, or Firm* — Muncy, Geissler, Olds & Lowe, P.C.

(57) ABSTRACT

A prediction method of part surface roughness and tool wear based on multi-task learning belong to the file of machining technology. Firstly, the vibration signals in the machining process are collected; next, the part surface roughness and tool wear are measured, and the measured results are corresponding to the vibration signals respectively; secondly, the samples are expanded, the features are extracted and normalized; then, a multi-task prediction model based on deep belief networks (DBN) is constructed, and the part surface roughness and tool wear are taken as the output of the model, and the features are extracted as the input to establish the multi-task DBN prediction model; finally, the vibration signals are input into the multi-task prediction model to predict the surface roughness and tool wear.

1 Claim, 4 Drawing Sheets

(51) Int. Cl.
*G01N 29/44* (2006.01)
*G05B 19/401* (2006.01)
*G06N 3/04* (2023.01)
*G06N 3/08* (2023.01)

(52) U.S. Cl.
CPC .............. *G05B 19/401* (2013.01); *G06N 3/04* (2013.01); *G06N 3/08* (2013.01); *G01N 2291/028* (2013.01); *G01N 2291/2698* (2013.01); *G05B 2219/33099* (2013.01)

(58) Field of Classification Search
CPC .. G01M 13/045; G01M 13/028; G01M 13/00; G06N 3/08; G06N 20/00; G06N 3/045; G06N 3/084; G06N 3/044; G06N 3/088; G06N 3/02; G06N 3/047; G06N 5/04; G06V 10/82; G06F 17/18; G06F 18/217; G06F 18/214; G06F 18/2178; G06F 11/3452; G05B 23/0283; G05B 19/4184; G05B 19/41875; G05B 23/024; G05B 13/028; G05B 23/0294; G05B 23/0229; G05B 2219/37351

USPC .......... 700/104; 702/34, 179, 183, 185, 188; 706/6, 12, 15–16, 20–21, 25, 52, 904, 706/912

See application file for complete search history.

(56) References Cited

FOREIGN PATENT DOCUMENTS

| | | | | |
|---|---|---|---|---|
| CN | 108747590 A | 11/2018 | | |
| CN | 108959833 A | 12/2018 | | |
| CN | 109396957 A | 3/2019 | | |
| CN | 109514349 A | 3/2019 | | |
| CN | 109746765 A | 5/2019 | | |
| CN | 110000610 A | 7/2019 | | |
| CN | 110059442 A | 7/2019 | | |
| CN | 110598299 A | 12/2019 | | |
| CN | 111177911 A | * | 5/2020 | .......... G06N 3/0454 |
| JP | 2018086712 A | 6/2018 | | |
| WO | WO-2014064319 A1 | * | 5/2014 | ............ G01B 21/30 |
| WO | WO-2017062784 A1 | * | 4/2017 | ............ B82Y 15/00 |

* cited by examiner

PREDICTION METHOD OF PART SURFACE ROUGHNESS AND TOOL WEAR BASED ON MULTI-TASK LEARNING

TECHNICAL FIELD

The invention belongs to the field of mechanical processing technology, and relates to a prediction method of part surface roughness and tool wear based on multi-task learning.

BACKGROUND

Surface quality is an important factor to determine machining performance. High quality surface can significantly improve the fatigue strength, corrosion resistance and creep life of parts. In the machining of parts, surface roughness is one of the main indexes of machining surface quality. Surface roughness can affect the functional properties of parts, such as surface friction and wear caused by contact. Tool wear is a normal phenomenon in metal cutting. Machining makes the tool edge passivated, increases the friction between the tool and the workpiece, and also increases the power consumption. If the tool wear condition can not be judged in time, the dimensional accuracy of the workpiece will be reduced, the surface roughness will be increased, and even the workpiece will be completely damaged. In the process of mass production of parts, tool wear will deteriorate the part surface roughness, and the change of part surface roughness will represent the situation of tool wear. Therefore, the accurate prediction of surface roughness and tool wear can significantly improve the machining quality and efficiency of parts.

At present, scholars have done a lot of research on the prediction of surface roughness and tool wear condition. In the patent "a prediction system for surface roughness of die steel milling based on ga-elm algorithm" (Application No.: CN 201810329036.2), the prediction model is established by using ga-elm algorithm, and the part surface roughness is predicted; In the patent "machine surface quality evaluation device" (Patent No.: US 20180307198 A1), the machine learning device observes the inspection results of the machined surface quality of the workpiece as a state variable, obtains the label data representing the observer's evaluation results of the machined surface quality of the workpiece, and learns the correlation between the state variable and the label data to realize the surface quality evaluation; In the patent "manufacturing efficiency optimization platform and tool condition monitoring and prediction method" (Patent No.: US 20160349737 A1), the state of the equipment is continuously monitored and analyzed by using sensor data, and the power consumption trend is predicted. When the power increases and the vibration increases to a predetermined level, it indicates that the tool has been worn to the extent that it needs to be replaced; In the patent "tool wear prediction method based on improved BP neural network" (Application No.: CN 201811122597.1), the tool data is classified and screened by clustering algorithm, the data is normalized, and the BP neural network model is established, and the tool wear condition is predicted by the established neural network; In the patent "a tool wear measurement method based on vibration spectrum and neural network" (Application No.: CN 201810685382.4), the vibration signal in the cutting process is collected by vibration sensor, and the vibration signal is transformed by Fourier transform. The mapping relationship between the frequency spectrum and the tool wear is established to predict the tool wear by inputting the vibration amplitude into the neural network. The above prediction methods only rely on the historical process data, collect the dynamic signals in the process of machining and extract the characteristics of the recognition signals, and do not need prior physical knowledge. It has low requirements for personnel, and has good accuracy, real-time performance and adaptability.

However, there are some problems in the current prediction methods, such as: (1) some traditional intelligent algorithms and machine learning algorithms are used. These networks are usually shallow structures, which limit the ability of the network to learn the complex nonlinear mapping relationship between cutting dynamic parameters and part surface roughness and tool wear. (2) Only the prediction of part surface roughness or tool wear condition can be realized alone, but the research on the prediction of part surface roughness and tool wear is not realized at the same time. Aiming at the above problems, the invention proposes a prediction method of part surface roughness and tool wear based on multi-task learning, which can realize the prediction of part surface roughness and tool wear condition at the same time.

SUMMARY

The purpose of the present invention is to provide a prediction method of part surface roughness and tool wear condition based on multi-task learning, and solve the problem that the existing prediction methods can only realize the prediction of part surface roughness or tool wear separately. The method can predict the part surface roughness and tool wear simultaneously.

Technical Solution of the Invention

A prediction method of part surface roughness and tool wear based on multi-task learning is presented:

Firstly, tri-axial acceleration sensor is used to collect the vibration signal of the spindle during the machining process; next, the part surface roughness and tool wear condition are measured by special measuring instrument, and the obtained roughness and tool wear condition are respectively corresponding to the vibration signal; secondly, Gaussian white noise with different intensity is added to the collected vibration signal, and the characteristics of vibration signal are extracted and normalized; then, the deep belief networks (DBN) are constructed, the multi-task prediction model of DBN is established by improving the existing network structure of DBN to make the DBN have the ability of multi-task learning. The part surface roughness and tool wear condition are taken as the output of the model, and the extracted dynamic signal features are used as the input to establish the multi-task network prediction model. Finally, the experimental verification is carried out, and the real-time vibration signal in the actual machining process is transmitted after data preprocessing. In the multi-task prediction model, the prediction model outputs the part surface roughness and tool wear condition, so as to realize the prediction of part surface roughness and tool wear.

Step One: Collect Vibration Signal During Machining

The tri-axial acceleration sensor is installed at the position of the spindle close to the tool holder to collect the tri-vibration signal of the spindle during the machining process of the CNC machine tool, and the vibration signal of the machine tool load is intercepted from the tri-axial vibration signal Step Two: Measure the Part Surface Roughness and Tool Wear A measurement equipment is used to measure the part surface roughness and tool wear; when measuring the part surface roughness, the surface of the parts is divided into 5 equal intervals according to the sampling length, and a roughness value is measured in each interval, and whether the surface quality of the parts is qualified or not is divided according to the roughness; tool wear condition measurement, tool wear is measured every fixed cutting distance, and the tool is divided into three conditions: normal, worn and damaged according to the tool whether there is obvious wear and damage; finally, the vibration data collected in the machining process are divided by the length of vibration data corresponding to each sampling length, and the surface roughness label and tool wear condition label are respectively corresponding to the vibration data after division.

Step Three: Sample Expansion and Feature Extraction (1) Sample Expansion

According to equation (1), M degree of Gaussian white noise is added to the collected vibration signal;

$$V_i^s = (k^2 i + k) \frac{\sigma}{M} V_{st}^s \tag{1}$$

Where: $V_{st}^s$ is the original vibration signal, s is the sample index, k is the different intensity parameter, i=1, 2, ..., M is used to control the different noise level, σ is the sample standard variance; after adding noise, each sample is expanded to M+1 group sample $\{V_{st}^s, V_1^s, \ldots, V_M^s\}$, the sample expansion is as follows:

$$Sa = V_{st}^s + V_i^s \tag{2}$$

(2) Dynamic Signal Feature Extraction and Normalization

In this method, the variance, root mean square, kurtosis, impulse factor and skewness features extracted from equation (3)~(7) are normalized;

$$Va = \frac{1}{N-1} \sum_{t=1}^{N} (V_i^s(t) - \bar{V})^2 \tag{3}$$

$$RMS = \left( \frac{1}{N} \sum_{t=1}^{N} V_i^s(t)^2 \right)^{1/2} \tag{4}$$

$$KUR = \left[ \frac{1}{N} \sum_{t=1}^{N} (V_i^s(t) - \bar{V})^4 \right] / \left[ \frac{1}{N} \sum_{t=1}^{N} (V_i^s(t) - \bar{V})^2 \right]^2 \tag{5}$$

$$IF = [V_i^s(t)_{max} - V_i^s(t)_{min}] / \left[ \frac{1}{N} \sum_{t=1}^{N} |V_i^s(t)| \right] \tag{6}$$

$$Ske = \left[ \frac{1}{N} \sum_{t=1}^{N} (V_i^s(t) - \bar{V})^3 \right] / \left[ \frac{1}{N} \sum_{t=1}^{N} (V_i^s(t) - \bar{V})^2 \right]^{3/2} \tag{7}$$

Where: $V_i^s(t)$ is the vibration data of a sample, t is the index of vibration data, N is the number of data contained in each sample, and $\bar{V}$ is the average value of each sample;

Step Four: The Construction and Training of Multi-Task Prediction Model Based on Improved DBN (1) Construction of Improved Deep Belief Networks The deep neural network A is constructed based on the deep belief networks; the deep neural network A is composed of three layers of restricted Boltzmann machine and a BP network; among them, the restricted Boltzmann machine is an energy-based model, and the joint probability distribution thereof is specified by the energy function, and the definition of the energy function is shown in equation (8)

$$E(v, h; \theta) = -\sum_{\alpha=1}^{V} \sum_{\beta=1}^{H} w_{\alpha\beta} v_\alpha h_\beta - \left( \sum_{\alpha=1}^{V} b_\alpha v_\alpha + \sum_{\beta=1}^{H} a_\beta h_\beta \right) \tag{8}$$

Among them, $v_\alpha$ and $h_\beta$ are the binary states of visible units α and hidden units β, θ={w,b,a} are the parameters of the model; $w_{\alpha\beta}$ are the weight between visible units α and hidden units β, $b_\alpha$ and $\alpha_\beta$ are offsets of visible units α and hidden units β, respectively, V and H is the number of visible and hidden units;

The energy of hidden neurons is as follows:

$$E_\beta = \sum_{\alpha=1}^{V} w_{\alpha\beta} v_\alpha + b_\alpha \tag{9}$$

Similarly, the energy of visible neurons is as follows:

$$E_\alpha = \sum_{\beta=1}^{H} w_{\alpha\beta} h_\beta + a_\beta \tag{10}$$

Mark the input layer to the first layer restricted Boltzmann machine as B1, and from the second layer restricted Boltzmann machine to the output layer as B2, copy B2 and mark it as B3, B3 is connected with the first layer restricted Boltzmann machine of deep neural network A, at this time, the network structure B2 and B3 are arranged side by side and connected with B1. According to the task requirements, the number of output layer nodes of B2 and B3 is set to complete the improvement of deep belief network; the improved deep belief network B is composed of network structure B1, B2 and B3, which can realize the function of multi-task learning.

(2) Training of Improved Deep Belief Network

Firstly, the greedy algorithm is used to pre-training the restricted Boltzmann machine of each layer in the deep neural network A, and the weight of the trained deep neural network A is assigned to the improved deep belief networks B. Then, based on the back-propagation algorithm, the supervised fine-tuning of the improved deep belief network B is carried out, and the loss function as equation (11) is adjusted to the optimal value to obtain multi-task predicting model.

$$L(\theta) = -\sum_{j=1}^{W} \frac{\lambda_j}{m} \left[ \sum_{k=1}^{m} \hat{y}_k \log y_k \right] \tag{11}$$

Among them, W is the total number of tasks in the multi-task model, $\lambda_j$ is the weight of each task, m is the total number of fine-tuning samples, $\hat{y}_k$ is the actual label, $y_k$ is the prediction label;

Step Five: Predict the Part Surface Roughness and Tool Wear Condition

In the actual machining process, the vibration data collected are pre-processed and input into the multi-task prediction model after training. The model outputs the part surface roughness and tool wear condition; task 1: outputs 1 when the part surface roughness is qualified, otherwise it is 0; Task 2: output 0 when the tool is not worn, output 1 when it is worn, and output 2 when it is damaged.

The beneficial effect of the invention: after the establishment of the multi-task prediction model, the on-line prediction of the part surface roughness and tool wear condition can be realized only by monitoring the dynamic signals in the machining process of the machine tool, which can timely remind the operator of the surface roughness of the parts and whether to replace the cutter, which is conducive to improving the production efficiency and quality of the parts.

Compared with the prior art, the invention has the advantages of: online prediction of part surface roughness and tool wear can be realized through one modeling, the hidden information contained in monitoring data is fully utilized, repetitive work is avoided, and workload and cost of model establishment are reduced.

DETAILED DESCRIPTION

In order to make the objectives, technical solutions and advantages of the present invention clearer, the present invention will be described in detail below with reference to the accompanying drawings.

Cutting experiments were carried out on a 3-axis vertical machining center with a vertical milling cutter. Among them, the basic information of the 3-axis vertical machining center is: the maximum stroke of X axis, Y axis and Z axis is 710 mm, 500 mm and 350 mm, the maximum feed speed is 32 m/min, 32 m/min and 30 m/min, and the maximum spindle speed is 15000 r/min. The basic information of the tool is: the type of the tool is vertical milling cutter; the tool material is cemented carbide; the diameter of the tool is 10 mm; and the number of cutting edges is 4. The basic information of the workpiece to be cut is as follows: the workpiece material is 45# steel; the workpiece shape is 200 mm×100 mm×10 mm. The cutting process parameters are as follows: the cutting depth is 2 mm; the feed rate is 80 mm/min; the spindle speed is 6000 r/min.

Figure 1:
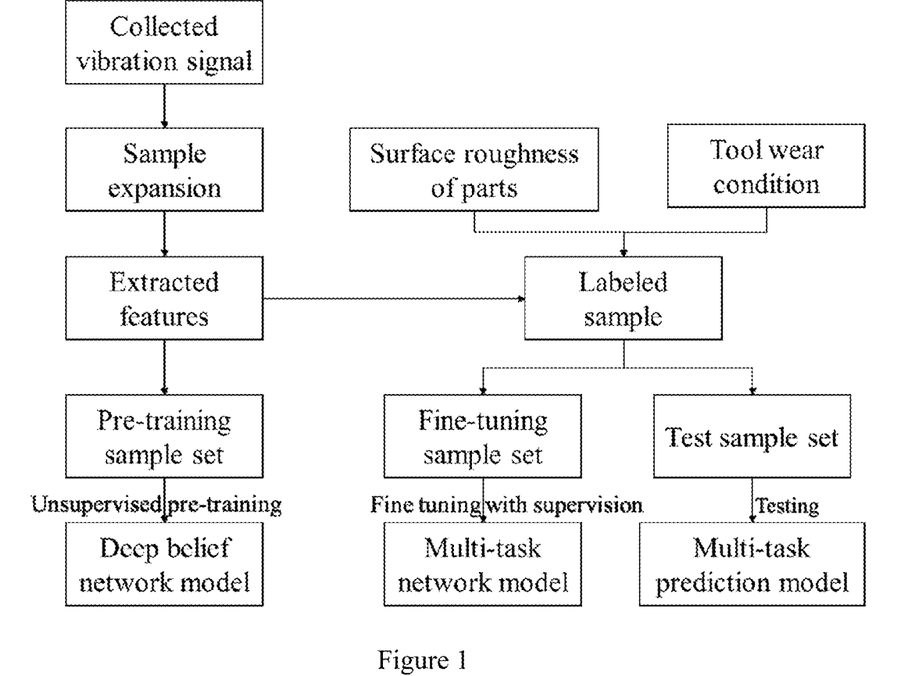
FIG. 1: Training flow chart of multi-task DBN prediction model.
Figure 2:
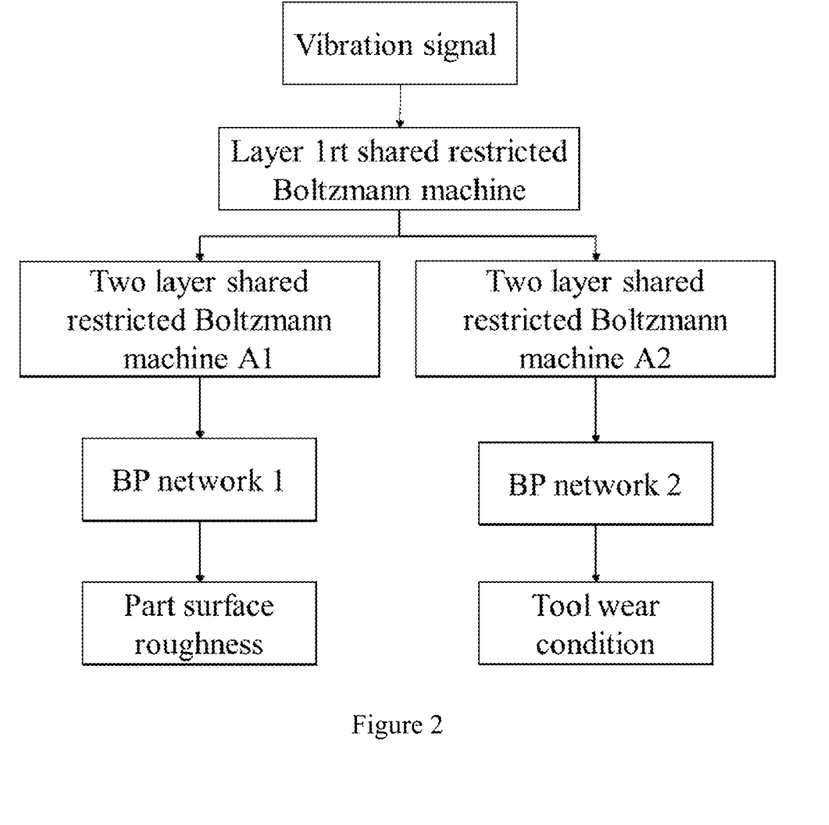
FIG. 2: Network structure of multi-task DBN prediction model.
Figure 3:
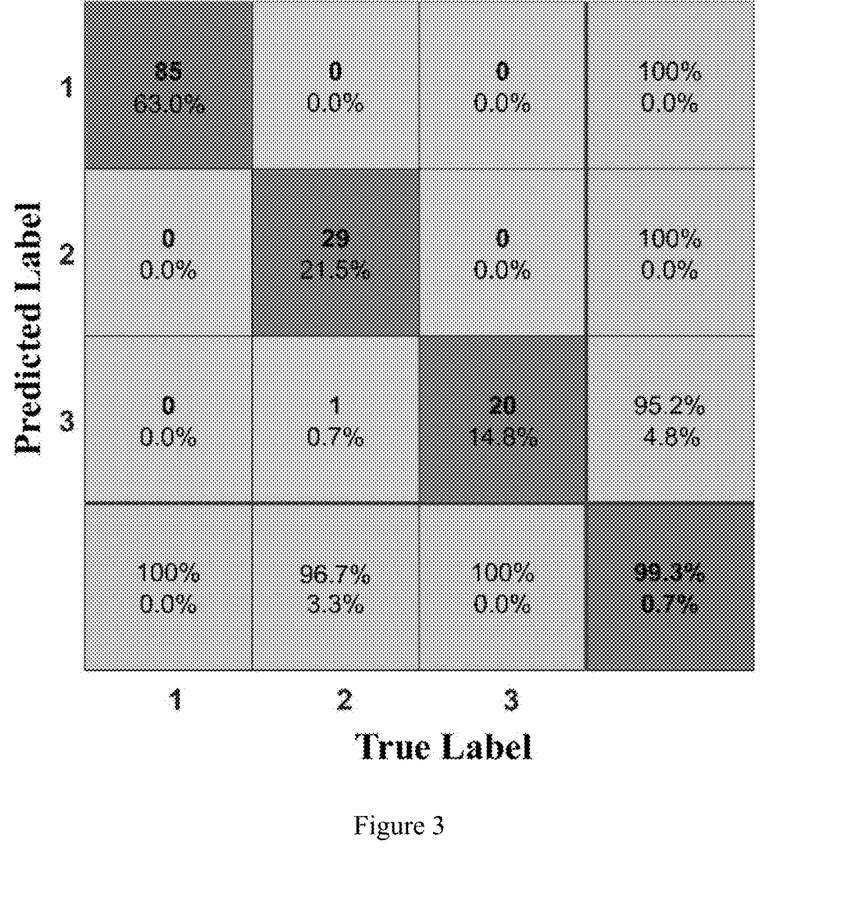
FIG. 3: Confusion matrix of tool wear prediction accuracy.
Figure 4:
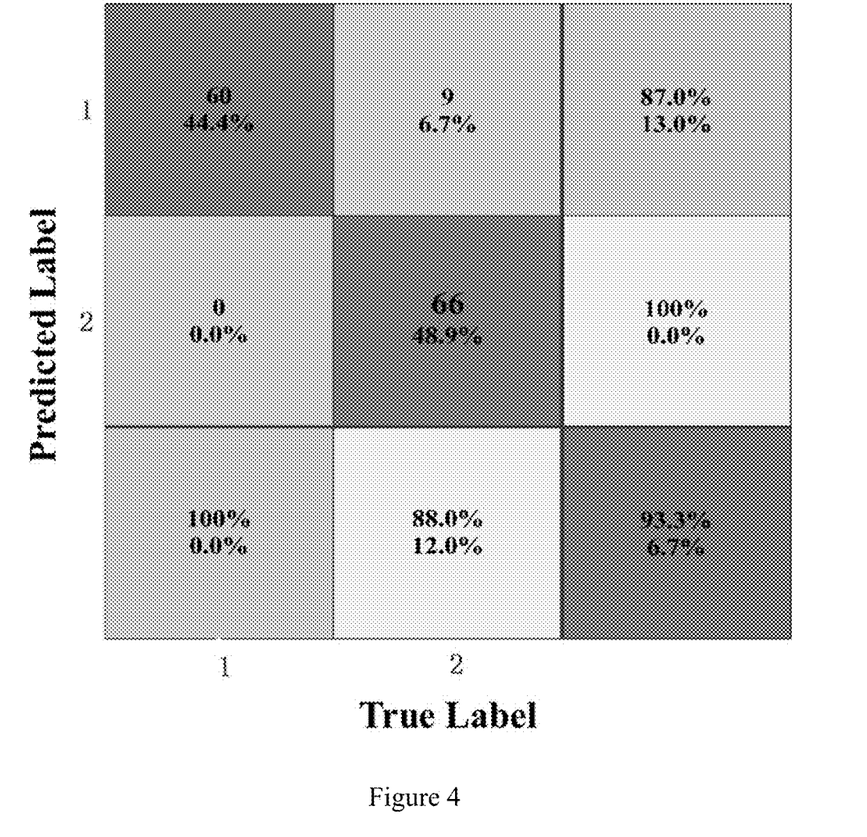
FIG. 4: Confusion matrix of prediction accuracy of part roughness.

The multi-task model training process is shown in FIG. 1, and the specific implementation mode is as follows:

Step One: Collect Vibration Signals During Machining

The cutting experiments is carried out in the 3-axis vertical machining center. The tri-axial acceleration sensor is installed at the position of the spindle near the toolholder, and the vibration signals of the spindle in X, Y and Z directions are collected and saved at the sampling frequency of 1000 Hz.

Step Two: Measure the Part Surface Roughness and Tool Wear

The part surface roughness and tool wear are measured by special measuring equipment. When measuring the surface roughness, the surface roughness of the part is divided into equal intervals according to the sampling length (4 mm), and a roughness value Ra is measured in each interval. According to the roughness size, the surface quality of the parts is divided into qualified or not with the threshold value of 0.8 μm. The tool wear condition is detected every 100 mm cutting distance, and the tool is divided into normal, worn and damaged condition according to whether the tool has obvious wear and damage. Finally, taking the vibration data length corresponding to each sampling length as the standard, 119 vibration data segments were obtained by dividing the collected vibration data into equal intervals, and 119 sets of sample datasets were obtained by matching the surface roughness label and tool wear condition label with the vibration data after division.

Step Three: Sample Expansion and Feature Extraction

According to equation (1), four different degrees of white Gaussian noise are added to the segmented vibration signal. After expansion, the total number of samples was 595 groups. Then, according to equation (3)~(7), the extracted features include kurtosis, margin factor, root mean square, variance and skewness. Since the vibration signal is divided into three directions, each sample contains 15 features.

Step Four: The Construction and Training of Multi-Task Prediction Model Based on Improved DBN A deep neural network A is constructed based on deep belief network. The network consists of three layers of restricted Boltzmann machine and a BP network. The number of neuron nodes in the input layer is 15, the number of neuron nodes in each layer is 200, 80 and 60, and the output layer is 2. Copy the restricted Boltzmann machine from the second layer to the output layer, connect the network B3 with the restricted Boltzmann machine in the second layer, and set the number of nodes in B3 output layer to 3 according to the requirements of task 2, that is, to complete the improvement of the deep belief network. The network structure of multi-task prediction model B based on improved DBN is 15-200-80 (80)-60 (60)-2 (3), which can realize the function of multi-task prediction. The data set is randomly divided into training set test set according to the ratio of 4:1. Firstly, the weight of neural network a is adjusted unsupervised by using the training set data, and the network weight is initially determined. At this time, the learning rate is 0.05 and the number of iterations is 1000. Next, the weight of the trained neural network A is assigned to the prediction model B as the initial parameter of the supervised fine-tuning multi task prediction model B Value. Then, the multi-task prediction model B is trained alternately by using the surface roughness label, tool wear condition label and the corresponding vibration signal characteristics. The weight of the prediction model is adjusted to the minimum and the loss function (equation 8) is adjusted to the minimum. Finally, the multi-task prediction model based on the improved DBN is obtained. Then test the multi-task model with test dataset. The results show that the accuracy of the proposed multi task prediction model for tool wear prediction is 99%, and the prediction accuracy of surface roughness of parts is 93%. The multi-task prediction model can be used to predict tool wear and part surface roughness.

Step Five: Predict the Surface Roughness and Tool Wear Condition.

The real-time vibration collected in the actual machining process is input into the multi-task prediction model based on improved DBN after data preprocessing, and the corresponding surface roughness and tool wear condition are obtained.

The invention claimed is:

1. A prediction method of part surface roughness and tool wear condition based on multi-task learning, comprising the following steps:

collecting vibration signal during machining by fixing tri-axial acceleration sensor at a position of a spindle, wherein the tri-axial acceleration sensor closest to tool holder to collect a tri-vibration signal of the spindle during a machining process of a CNC machine tool, and the vibration signal of a machine tool load is intercepted from a tri-axial vibration signal;

using measurement equipment to measure a part surface roughness and tool wear; when measuring the part surface roughness, dividing a surface of the part into equal intervals according to a sampling length, and measuring a roughness value in each interval, wherein whether surface quality of the part is qualified or not is divided according to the roughness; tool wear is measured every fixed cutting distance, and the tool is categorized into three conditions being normal, worn and damaged according to whether there is obvious wear and damage of the tool; finally, dividing vibration data collected in the machining process by a length of vibration data corresponding to each sampling length, wherein a surface roughness label and a tool wear condition label are respectively corresponding to the vibration data after division;

according to equation (1), adding M degree of Gaussian white noise to the collected vibration signal;

$$V_i^s = (k^2 i + k)\frac{\sigma}{M} V_{st}^s \tag{1}$$

where: $V_{st}^s$ is an original vibration signal, s is a sample index, k is a different intensity parameter, i=1, 2, ..., M is used to control a different noise level, $\sigma$ is a sample standard variance; after adding noise, each sample is expanded to M+1 group sample $\{V_{st}^s, V_1^s, \ldots, V_M^s\}$, the sample expansion is as follows:

$$Sa = V_{st}^s + V_i^s \tag{2}$$

normalizing the variance, root mean square, kurtosis, impulse factor and skewness features extracted from equation (3)~(7);

$$Va = \frac{1}{N-1}\sum_{t=1}^{N}(V_i^s(t) - \overline{V})^2 \tag{3}$$

$$RMS = \left(\frac{1}{N}\sum_{t=1}^{N} V_i^s(t)^2\right)^{1/2} \tag{4}$$

$$KUR = \left[\frac{1}{N}\sum_{t=1}^{N}(V_i^s(t) - \overline{V})^4\right] \bigg/ \left[\frac{1}{N}\sum_{t=1}^{N}(V_i^s(t) - \overline{V})^2\right]^2 \tag{5}$$

$$IF = [V_i^s(t)_{max} - V_i^s(t)_{min}] \bigg/ \left[\frac{1}{N}\sum_{t=1}^{N}|V_i^s(t)|\right] \tag{6}$$

$$Ske = \left[\frac{1}{N}\sum_{t=1}^{N}(V_i^s(t) - \overline{V})^3\right] \bigg/ \left[\frac{1}{N}\sum_{t=1}^{N}(V_i^s(t) - \overline{V})^2\right]^{3/2} \tag{7}$$

where: $V_i^s(t)$ is the vibration data of a sample, t is an index of vibration data, N is a number of data contained in each sample, and $\overline{V}$ is an average value of each sample;

constructing a deep neural network A based on deep belief networks, wherein the deep neural network A is composed of three layers of restricted Boltzmann machine and a BP network; among them, the restricted Boltzmann machine is an energy-based model, and its joint probability distribution is specified by an energy function, and a definition of the energy function is shown in equation (8), $$E(v, h; \theta) = -\sum_{\alpha=1}^{V}\sum_{\beta=1}^{H} w_{\alpha\beta} v_\alpha h_\beta - \left(\sum_{\alpha=1}^{V} b_\alpha v_\alpha + \sum_{\beta=1}^{H} a_\beta h_\beta\right) \tag{8}$$

where $v_\alpha$ and $h_\beta$ are the binary states of visible and hidden units, $\theta=\{w,b,a\}$ are the parameters of the model; $w_{\alpha\beta}$ are the weight between visible units $\alpha$ and hidden units $\beta$, $b_\alpha$ and $a_\beta$ are offsets of visible units $\alpha$ and hidden units $\beta$, respectively, V and H is the number of visible and hidden units; the energy of hidden neurons is as follows:

$$E_\beta = \sum_{\alpha=1}^{V} w_{\alpha\beta} v_\alpha + b_\alpha \tag{9}$$

similarly, the energy of visible neurons is as follows:

$$E_\alpha = \sum_{\beta=1}^{H} w_{\alpha\beta} h_\beta + a_\beta \tag{10}$$

marking the input layer to the first layer restricted Boltzmann machine as B1, and from the second layer restricted Boltzmann machine to the output layer as B2, copying B2 and marking it as B3, wherein B3 is connected with the first layer restricted Boltzmann machine of deep neural network A, at this time, arranging the network structure B2 and B3 side by side and connecting with B1; according to the task requirements, setting the number of output layer nodes of B2 and B3 to complete the improvement of deep belief network, wherein the improved deep belief network B is composed of network structure B1, B2 and B3, which can realize the function of multi-task learning;

using a greedy algorithm to pre-train the restricted Boltzmann machine of each layer in the deep neural network A, and assigning the weight of the trained deep neural network A to the improved deep belief networks B, wherein based on the back-propagation algorithm, the supervised fine-tuning of the improved deep belief network B is carried out, and the loss function as equation (11) is adjusted to the optimal value to obtain multi-task predicting model;

$$L(\theta) = -\sum_{j=1}^{W}\frac{\lambda_j}{m}\left[\sum_{k=1}^{m}\hat{y}_k \log y_k\right] \tag{11}$$

where, W is the total number of tasks in the multi-task model, $\lambda_j$ is the weight of each task, m is the total number of fine-tuning samples, $\hat{y}_k$ is the actual label, $y_k$ is the prediction label;

in the actual machining process, pre-processing the vibration data collected and inputting the pre-processed vibration data into the multi-task prediction model after training; the multi-task prediction model outputs the part surface roughness and tool wear condition; as task 1, outputting 1 when the part surface roughness is qualified, and outputting 0 when the part surface roughness is not qualified; and as task 2, outputting 0 when the tool is not worn, outputting 1 when it is worn, and outputting 2 when it is damaged.

* * * * *